Feb. 13, 1951     A. L. JONES ET AL     2,541,069
LIQUID THERMAL DIFFUSION APPARATUS
Filed June 7, 1947     2 Sheets-Sheet 1
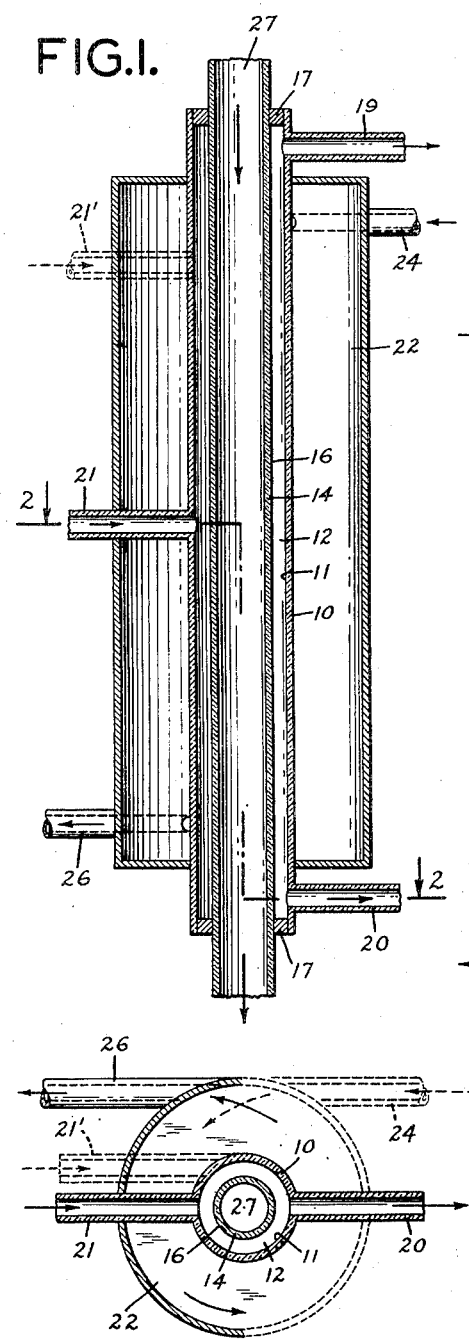
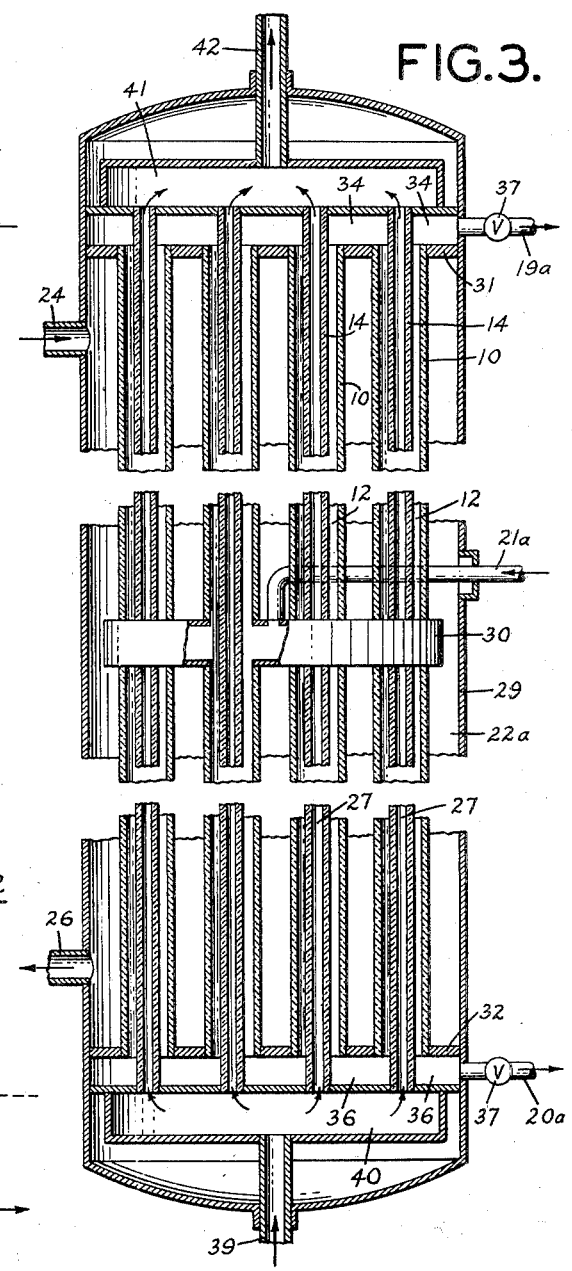
INVENTORS
ARTHUR LETCHER JONES
EVERETT C. HUGHES
BY
Campbell, Brumbaugh & Free
ATTORNEYS.

Patented Feb. 13, 1951

2,541,069

UNITED STATES PATENT OFFICE 2,541,069

LIQUID THERMAL DIFFUSION APPARATUS

Arthur Letcher Jones, Cleveland, and Everett C. Hughes, Cleveland Heights, Ohio, assignors to The Standard Oil Company, Cleveland, Ohio, a corporation of Ohio Application June 7, 1947, Serial No. 753,200

4 Claims. (Cl. 210—52.5)

The present invention relates to novel apparatus for carrying out, in a continuous manner, the separation of dissimilar materials while the material is in the liquid or dissolved state.

The term "dissimilar materials" refers to two or more components of a mixture in a liquid or liquefiable state, to different components dissolved in a common solvent, as well as to a solvent and a solute. Examples of such dissimilar materials are hexadecane and isopropyl benzene, the ortho, meta, and para isomers of xylene, an azeotropic mixture of benzyl alcohol and ethylene glycol, an aqueous solution of sodium chloride, and the like.

The term "separation" as used hereinafter is intended to include not only separation in the ordinary sense of the word but also rectification, concentration, enrichment and purification. Thus, for example, the "separation of dissimilar materials" includes the separation of compounds such as hexadecane and isopropyl benzene from a mixture of said compounds or the formation of two fractions, one richer in hexadecane and the other richer in isopropyl benzene than the starting mixture, the concentration or enrichment of active vitamins from a mixture of ordinarily inseparable components, one of which may have vitamin activity and the other not having such activity, the separation or concentration of antibiotics and other biological products from a solution containing the same, the refining of petroleum oils, and the separation of vegetable and animal oils, fats and waxes into components having different degrees of unsaturation and indexes of refraction.

It has been known for some time that it is possible to separate dissimilar materials by means of liquid thermal diffusion. The principle involved, however, is not understood with certainty and apparently no industrial use has thus far been made of the phenomenon. Apparatus known to have been devised heretofore to effect separation of dissimilar materials has consisted essentially of a narrow and elongated slit in a non-horizontal position and is believed to be suitable only for a batch type process. This apparatus is completely filled with a fluid containing dissimilar components and a temperature gradient is maintained between the opposite walls of the slit for an indefinite, extended period of time. At the end of this period one end of the slit contains a higher concentration of one of the dissimilar materials than does the other end.

Whereas at least one rather intricate theory has been advanced to explain gaseous thermal diffusion, no theory is believed to have been advanced in an attempt to explain liquid thermal diffusion, and authorities have indicated that any satisfactory theory is practically impossible. It has been found in the development of the present invention, that theories applicable to gaseous thermal diffusion are inadequate and often misleading when applied to liquid thermal diffusion. It is therefore believed, in view of the wide difference in results obtained, as well as of the difference in inter-molecular forces, that liquid thermal diffusion involves different or additional determining factors that do not play any, or an important, part in gaseous thermal diffusion. Consequently, liquid thermal diffusion cannot be based on any knowledge available regarding gaseous thermal diffusion. For this reason liquid and gaseous thermal diffusion must be considered as completely non-analogous for all practical purposes.

To illustrate this difference, it may be noted that in a successful gaseous thermal diffusion the light component diffuses toward the hot wall and rises to the top of the slit and the heavy component diffuses toward the cold wall and descends to the bottom. The primary factor which permits separation of two materials by gaseous thermal diffusion, where the molecules are not in contact, is a difference in mass. In liquid thermal diffusion, where the molecules are in contact, the mass of the molecules does not determine the direction of separation. Thus, for example, it was found that the thermal diffusion of a mixture of hexadecane and isopropyl benzene, the heavier hexadecane, having a molecular weight of 226.25, became concentrated at the top and the lighter isopropyl benzene, having a molecular weight of 120.15, became concentrated at the bottom. Perhaps still more surprising was the discovery that materials of not only the same molecular weight but of identical empirical formula, i. e., isomers of one another such as the alpha- and beta-isomers of monomethyl naphthalene, can be separated by liquid thermal diffusion.

The present invention comprises apparatus for continuously separating dissimilar components by liquid thermal diffusion including means for continuously removing dissimilar fractions of a liquid from a substantially uniform narrow slit at two points or areas remote from one another, and means for continuously introducing a liquid into the narrow slit at a location intermediate the points or areas from which the dissimilar fractions are continuously removed.

While the present invention is not to be limited by any theory presented herein, it is believed that the phenomenon of liquid thermal diffusion may be explained on the theory that the molecules of certain materials or components acquire greater kinetic energy of translation by absorption of heat from the hot wall than do the molecules of the other material or component and that, as a result, those molecules acquiring the higher kinetic energy of translation will tend to move further away from the hot wall. A convection current is set up in the slit so that the fluid adjacent the hot wall will rise and the fluid adjacent the cold wall will descend, with the result that the molecules having greater kinetic energy of translation imparted to them and tending to move further away from the hot wall pass downwardly next to the cold wall into the lower part of the slit, whereas the other components will rise adjacent the hot wall in the slit and flow into the upper part of the slit.

The prime advantage of this apparatus is that liquid separations hitherto considered to be impossible or impracticable by other methods, can now be carried out on a commercial scale. This advantage is inherent in the apparatus of this invention because it avoids the necessity of carrying out separations by liquid thermal diffusion in batches and on a small scale, and utilizes the phenomenon of thermal diffusion to effect separations in a continuous manner that cannot be carried out by fractionation or other known methods.

Other important advantages of this apparatus are that the use of reservoirs is eliminated, thus greatly reducing the time required to achieve equilibrium conditions, and that the liquid removed is replaced continuously without seriously disturbing the concentration gradient within the slit.

The prime and other important advantages already mentioned, as well as the further advantages, utility and objects of the apparatus of this invention, will become apparent from the following detailed description made with reference to the accompanying drawing wherein:

Figure 1 is a schematic cross-sectional view through one modification of a concentric tube type of continuous liquid thermal diffusion apparatus;

Figure 2 is a horizontal section taken on section line 2—2 of Figure 1 looking in the direction of the arrows;

Figure 3 is a schematic cross-sectional view through a multiple tube type of continuous liquid thermal diffusion apparatus;

Figure 4:
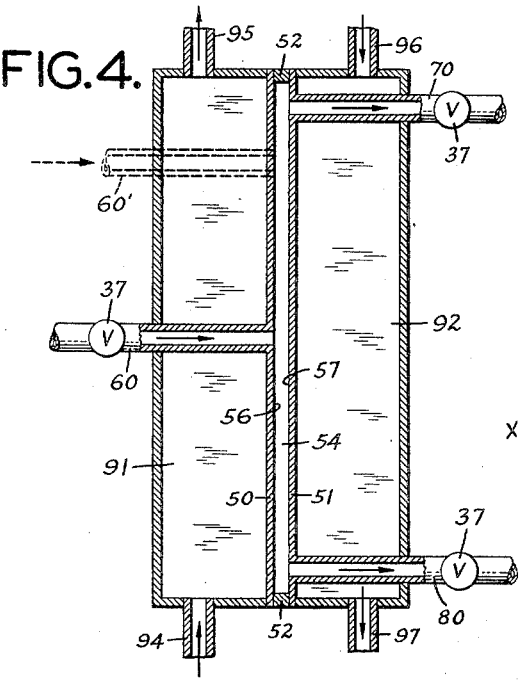
Figure 4 is a horizontal section through a plate type of liquid thermal diffusion apparatus.

The concentric tube type of apparatus illustrated by way of example in Figures 1 and 2 has the peculiar advantage of providing a slit defined almost entirely by the opposed walls of the slit, of providing the greatest slit surface area for a given amount of weight, floor space and height, and of being the most efficient from a structural point of view. The plate type apparatus on the other hand, as illustrated by way of example in Figures 4 and 5, has the peculiar advantages of being operative in the vertical or inclined position and of affording an opportunity to make the slit-width more readily adjustable.

The apparatus illustrated in Figures 1 and 2 includes an outer tube 10, the inner surface 11 of which constitutes one wall of a slit 12, and a hollow inner tube 14 arranged concentrically with relation to the outer tube 10, the outer surface 16 of said inner tube 14 constituting the other surface of the slit 12. The distance between surface 16 of the inner tube 14 and the surface 11 of the outer tube 10 is maintained substantially uniform by means of suitable gaskets or spacers 17 at or near the ends of the tubes and, if necessary, at intermediate points within the slit 12.

The outer tube 10 is provided at or near its ends with take-off ports 19 and 20 and half way between or at some other intermediate point with an inlet port 21. It is, of course, not necessary that the inlet port 21 be on the opposite side of the outer tube 10 from the take-off ports 19 and 20, as shown in Figures 1 and 2. The ports 19, 20 and 21 may all be on one side of the tube 10, at any desired angle or angles to one another and, if desired, one or more of them may be arranged tangentially relative to outer tube 10, as shown at 21'.

A jacket 22 having one or more inlets 24 and outlets 26 may, if desired, be provided to surround the outer tube 10. If it is desired to make surface 11 the hot wall of slit 12, hot fluid may be introduced through inlet 24, circulated through jacket 22 around outer tube 10 and withdrawn from the jacket by way of outlet 26, and a cooling fluid may be passed through the interior 27 of inner tube 14. If, on the other hand, it is desired to make surface 16 the hot wall of the slit 12, a hot fluid or a heating element may be passed through or maintained within the interior 27 of inner tube 14 and a cooling medium may be circulated through jacket 22. In some instances the temperature of surface 11 may be maintained at the desired level by dispensing with the jacket 22 and simply circulating air around the outside of outer tube 10 or by providing other types of well-known heating or cooling elements.

It is to be understood, of course, that inlet port 21 and outlet ports 19 and 20 may be provided with suitable shut-off or flow-regulating valves, and that the outer tube 10 may be provided with a number of inlet ports, such as 21 and 21', at various points along the length of the slit 12 so that the liquid to be subjected to thermal diffusion may be introduced at any point along the length of the slit 12 at the will of the operator.

The multiple tube type apparatus illustrated by way of example in Figure 3 includes a bundle of tube units, each unit including a concentrically arranged outer and inner tube 10 and 14, respectively, enclosed within a casing 29. The liquid to be subjected to thermal diffusion is introduced by way of line 21a into a header 30 that surrounds the outer tubes 10 and flows from the header 30 into the slits 12 between the outer and inner tubes 10 and 14, respectively, through one or more openings in the outer tubes 10 communicating with the interior of the header 30.

The number and size of the holes in each outer tube 10 is not particularly critical, but should not be so small as to set up turbulence within the slits 12 at the rate of flow of liquid for which the apparatus is designed. It is believed that this criterion is satisfied as long as the speed of flow of liquid through the hole or holes does not substantially exceed the speed of convective circulation with the slits 12.

The outer tubes 10 are maintained in their proper position by means of perforated plates 31 and 32, the outer tubes 10 being sealed to the plates 31 and 32 and said plates being sealed to the casing 29 by conventional means to effectively seal the top take-off header 34 and the bottom take-off header 36, respectively, from the jacket 22a surrounding the outer tubes 10. A top take-off port or line 19a which may, if desired, have a shut-off or flow-regulating valve 37, is provided to withdraw from header 34 the top fraction of the thermally diffused liquid flowing from the tops of slits 12. A bottom take-off port or line 20a which, if desired, may likewise have a shut-off or flow-regulating valve 37, is provided to withdraw from header 36 the bottom fraction of the thermally diffused liquid flowing from the bottoms of slits 12.

The jacket 22a surrounding the outer tubes 10 is provided with one or more inlets 24 and outlets 26. The inner tubes 14 are maintained in their proper positions within the outer tubes 10 primarily by means of headers 40 and 41, the interiors of which communicate with the interiors 27 of the inner tubes 14. Suitable spacers may also be provided within the slits 12 if they are required to maintain a substantially uniform distance between the exterior surfaces of inner tubes 14 and the interior surfaces of the outer tubes 10. Headers 40 and 42 communicate with an inlet 39 and an outlet 42, respectively.

It is to be understood that the direction of flow of the temperature controlling media can be the reverse of that indicated by the arrrows at inlet 39 and the outlet 42, or for that matter, at inlet 24 and outlet 26.

Figure 5:
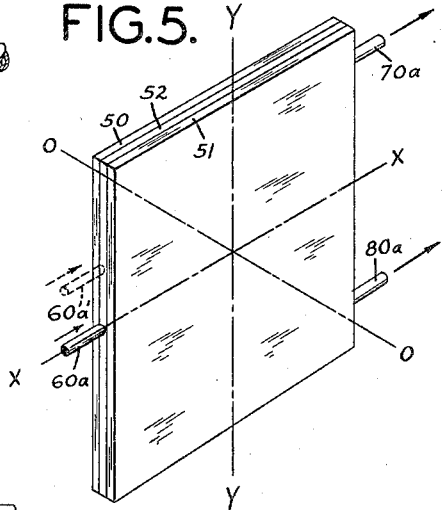
Figure 5 is a view in perspective of the plate type apparatus shown in Figure 4.

The plate type apparatus illustrated in Figures 4 and 5 includes two plates 50 and 51 which may be of the same or different materials and spaced from one another by a spacer or gasket 52 located between the peripheral edges of plates 50 and 51 and, if necessary, at intermediate points within the slit 54 formed by the inner walls 56 and 57 of plates 50 and 51, respectively.

In the modification illustrated in Figure 4 the plate 51 is provided at its upper and lower ends with take-off ports 70 and 80 and the other plate 50 is provided at an intermediate point with an inlet port 60. Here again, the inlet port 60 may be located half-way between take-off ports 70 and 80 or at a point closer to one of the take-off ports than to the other, as shown in dotted lines at 60', or a number of inlet ports, such as 60 and 60', may be located at various points along the length of slit 54 so that the liquid to be subjected to thermal diffusion may be introduced at any point along the slit at the will of the operator. Ports 60, 70 and 80, as well as any alternative or additional ports such as 60', may be provided with suitable shut-off or flow-regulating valves 37.

Either or both of the plates 50 and 51 may furthermore be provided with jackets such as those shown schematically in Figure 4 at 91 and 92. Jacket 91 is provided with at least a pair of ports 94 and 95, one of which may be used as an inlet port for a cooling medium and the other of which may be used as an outlet port for a cooling medium. Jacket 92 is similarly provided with at least a pair of ports 96 and 97, one of which serves as an inlet port for a heating medium and the other of which serves as an outlet port for a heating medium.

Here again, it is immaterial whether jackets 91 and 92 be used as cooling and heating jackets respectively, or vice versa. Furthermore, if the liquid to be subjected to thermal diffusion in this type of apparatus is such that the temperature of the cold or hot wall can be maintained at the desired level by dispensing with one of the jackets 91 or 92, it is within the contemplation of this invention to maintain the temperature of said wall at that level by leaving it exposed to the atmosphere or, if desired, subjecting it to a flow of circulating air. If it is found desirable to maintain the temperature of one of the walls at a level prevailing in the surrounding atmosphere, it is furthermore possible to provide what would otherwise be the side of the wall facing the interior of the jacket with a number of fins to enhance the efficiency of heat conduction between the atmosphere and the surface forming one wall of the slit.

The modification illustrated by way of example in Figure 5 is similar to that illustrated in Figure 4, the jackets 91 and 92, however, being not shown. It differs from the modification illustrated in Figure 4 in that inlet port 60a and outlet ports 70a and 80a are in line with the slit 54. This arrangement has the advantage of minimizing turbulence within the slit 54 and of being more adaptable to a multiple plate type of apparatus. Here again, inlet port 60a may be located midway between take-off ports 70a and 80a or, as shown at 60a', at any other point intermediate said take-off ports. Furthermore, a number of inlet ports such as 60a and 60a' may be provided so that the liquid to be subjected to thermal diffusion may be introduced into any portion of the slit 54 at the will of the operator.

The plate type apparatus, whether it be constructed as shown in Figure 4, or Figure 5, may be operated with its X—Y plane vertical or at any desired angle to the O—O axis. When the plate type apparatus is operated in any position other than the vertical position, however, it is desirable that the uppermost of the two opposing walls be maintained at a higher temperature than the lower wall to prevent the convective currents in the liquid from interfering with the smooth laminar flow within the slit 54. The plate type apparatus may also be operated with the X—Y axis rotated on the O—O axis so that one corner of the apparatus would be higher than any of the others and the opposite corner would be lower than any of the others. In this event, it is desirable to locate the take-off ports 70 and 80, or 70a and 80a, near the upper and lower corners, respectively.

While it may not be desirable to vary the slit-width after the optimum has been selected, the plate type apparatus is adaptable to a construction that permits the slit-width to be changed from time to time, should this be desired. This may be accomplished by replacing the spacing gasket 52 with a resilient or bellows-like material and supporting the opposed plates upon a mechanism capable of adjustably maintaining the plates parallel to one another at various spacings. Instead of a bellows type of arrangement to connect the peripheral edges of the plates, it is also quite possible to provide spacers that are pivoted at two opposite edges and are capable of limited deformation at the other two opposite edges. In this type of arrangement the slit-width could be varied simply by moving one plate laterally for a small distance relative to the other plate.

It is furthermore possible to provide the apparatus with means for inducing forced circulation rather than, or in addition to, the thermal circulation induced by the difference in temperature between the hot and cold walls. This may be accomplished, for example, by moving the hot wall upwards and the cold wall downwards.

It is furthermore within the contemplation of this invention to provide a series of thermal diffusion apparatus whereby a top or bottom fraction, or both, may be subjected to one or more further passes.

Figure 6:
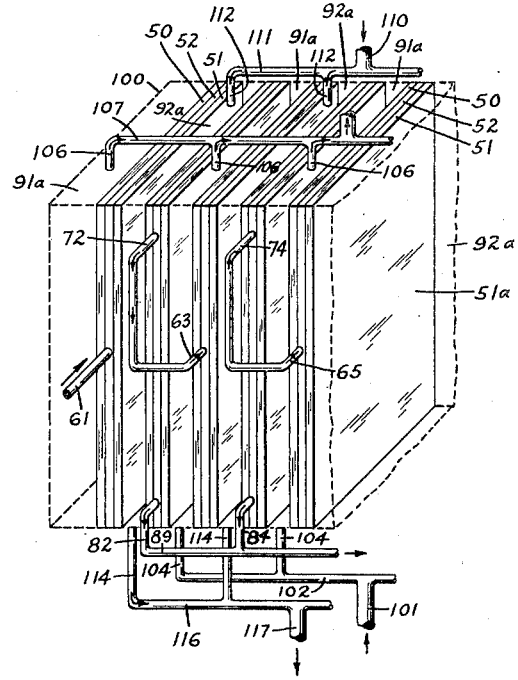
Figure 6 is a view in perspective of a multiple plate type apparatus designed to effect separation of a liquid to a maximum degree.

One such arrangement of apparatus, referred to hereinafter as a multi-stage plate type apparatus, is illustrated schematically in Figure 6. This comprises a container 100, shown in phantom, having a plurality of groups of plate 50 and 51 separated by spacing gaskets 52, each group of plates being separated from the adjacent groups by jackets 91a and 92a as shown in the drawing. The liquid to be subjected to thermal diffusion is introduced into the first slit formed by the first group of plates 50 and 51 through inlet port 61. The top fraction is withdrawn through an outlet port, not shown, but similar to port 70a shown in Figure 5, and then introduced into the slit between the second group of plates 50 and 51 midway between outlet ports 72 and 82. The bottom fraction is drawn off into a line communicating with line 89. The top fraction from the slit between the second group of plates is withdrawn through outlet port 72 and introduced into a slit between the third group of plates 50 and 51 through inlet port 63. The bottom fraction from the slit between the second group of plates 50 and 51 is withdrawn through outlet port 82 and removed by way of line 89. The top fraction leaving the slit between the third group of plates 50 and 51 is introduced into a fourth slit and the bottom fraction is removed by way of a line communicating with line 89. The top fraction from the slit formed by the fourth group of plates 50 and 51 is removed through outlet port 74 and introduced into a slit formed by the fifth group of plates 50 and 51 through inlet port 65. The bottom fraction from the slit formed by the fourth group of plates 50 and 51 is removed by way of outlet port 84 and introduced into line 89.

This apparatus may have as many groups of plates 50 and 51 as are found necessary to effect a given degree of separation, the number of groups required being dependent upon a number of inter-dependent variable factors discussed more fully hereinafter.

Jackets 91a may have a cooling medium circulated through them from a source 101 through a header 102 having one or more branches 104 leading to each jacket 91a. After the cooling medium circulates through the jackets 91a, it may be withdrawn by one or more branch lines 106 to a header 107. Heating jackets 92a may have a heating medium circulated through them. One system for accomplishing this is to feed steam from a source 110 through a header 111 into one or more branch lines 112 for each heating jacket 92a to introduce the steam into the heating jackets, the cooled steam or condensate, or both, being withdrawn from each of the heating jackets 92a by means of branch lines 114 communicating with a header 116 having a withdrawal line 117 through which the steam and/or condensate may be discharged to waste or to other equipment.

This type of apparatus is designed particularly to effect separation when one of the components to be separated is present in a very small amount and repeated treatment is necessary to concentrate it. For this reason, this apparatus has special utility only in the separation of materials that are present in low concentrations or that are particularly difficult to separate or concentrate. Examples of such materials are vitamins, and other low concentration biological products.

It is, of course, equally possible to subject the bottom fractions to repeated thermal diffusion. Furthermore, it is also quite possible to arrange the apparatus in such a manner as to subject both the bottom and top fractions to continued thermal diffusion in separate series of slits.

Figure 7:
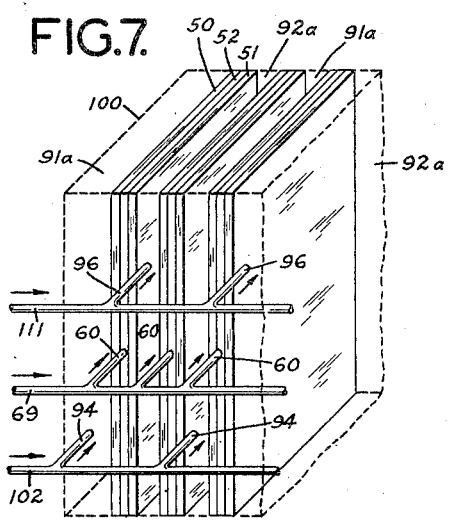
Figure 7 is a view in perspective of a multiple plate type apparatus designed to effect separation of a liquid on a large scale.

A multiple plate type apparatus designed primarily to separate large quantities of dissimilar materials is illustrated schematically in Figure 7. Any number of groups of plates 50 and 51 again may be disposed in a container 100, shown in phantom, each set of plates having an inlet port and take-off ports similar to those shown in Figure 5. In this arrangement, the liquid to be subjected to thermal diffusion enters each of the slits formed by the various groups of plates through inlet ports 60 from a header 69. Alternate jackets 91a between the groups of plates 50 and 51 may have circulated through them a cooling medium introduced by way of inlets 94 communicating with a header 102 and a heating medium may be circulated through jackets 92a by introduction of steam or the like through inlets 96 from a header 111. The cooling and heating media may be withdrawn from these jackets 91a and 92a in substantially the same manner as described with reference to the apparatus illustrated in Figure 6.

It is to be understood that the terms "hot" and "cold" as applied to the slit walls, and "heating" and "cooling," as applied to the temperature controlling media, are used in their relative rather than their absolute sense. Thus, for example, the hot and cold walls of a slit may be maintained at temperatures of 160° C. and 100° C,. respectively, or, if the boiling point of the liquid to be subjected to thermal diffusion is low, at temperatures of °0 C. and −35° C., respectively. The heating media, in such instances, may be steam under pressure or a boiling mixture of water and ethylene glycol, or it may be ice water. The cooling media, in the examples given, may be saturated steam at atmospheric pressure, or vaporizing ammonia.

Any source of heat may be utilized to maintain the temperature of the hot wall. Depending upon the temperature that is to be maintained, it may be desirable to use condensing vapors of steam or other liquids of known boiling point at atmospheric or other pressure, electric heating devices and hot circulating liquids. Conventional cooling methods may also be applied to the cold wall. Among such methods are air cooling, liquid circulation, vaporizing liquid systems, and other conventional refrigerating means.

It is also quite possible to utilize the thermal diffusion apparatus in combination with other apparatus wherein the former has the additional and incidental function of serving as a heat exchanger for fluids wherein the fluid that is to absorb heat is brought into contact with the wall serving as the cold wall and the fluid that is to be cooled is brought into contact with the wall serving as the hot wall.

The apparatus may be constructed of any solid material such as glass, metal or any solid material capable of conducting sufficient heat and having the structural strength necessary to maintain its structural shape. The slit may be formed by any suitable arrangement of spaced walls such as by means of concentric tubes or parallel plates.

The more important variables of the apparatus of this invention are the slit-width, i. e., the distance between the hot and cold walls of the slit, the slit length, i. e., the length of the thermal diffusion section across which a temperature gradient is maintained, and the means for maintaining the temperature levels of the hot and cold walls that are required for a particular operation. Other variables in the structure of the apparatus are the surface area of each slit, i. e., the sum of the products of the length and (in the tube type apparatus) the outside and inside circumference of the inner and outer tubes, respectively, or (in the plate type apparatus) the lateral extent of each wall of the slit, and the position of the inlet port or feed relative to the take-off ports.

In the operation of the liquid thermal diffusion apparatus, the following additional variable factors play a part in the results obtained: the temperature level of operation, particularly in relation to the viscosity and boiling point of the liquid to be subjected to thermal diffusion, the rate of feed of the liquid through the slit, the ratio of the rates of withdrawal of the top and bottom fractions, the magnitude of the temperature gradient, the composition of the liquid to be subjected to thermal diffusion, and the degree of separation desired.

Generally, it may be stated that the rate of feed and the temperature gradient may be greater for larger slit-widths and that the efficiency of separation, measured in terms of percentage of separation achieved at a given rate of flow, increases with an increase in the length of the slit. Thus, for example, it was found that an 8 ft. column having a slit-width of $\frac{1}{16}$ of an inch was capable of producing twice the separation produced by a 4 ft. column having a similar slit-width, at rates of feed varying from 15 to 105 cc./hour, and that an 8 ft. column having a slit-width of $\frac{1}{16}$ of an inch produced a more complete separation at rates of feed above 55 cc./hour than an 8 ft. column having a slit-width of $\frac{1}{32}$ of an inch, but that at rates of feed below 55 cc./hour the efficiency of separation produced by the 8 ft. column having the lesser slit-width was greater than that of the other 8 ft. column. Experiments comparing the effectiveness of a 5 ft. column with that of a 24 ft. column showed that the latter is approximately five times as effective as the former over a wide range of feed rates.

When, however, the efficiency of separation was measured in terms of percentage of separation at a given rate of flow per square foot of slit surface area, it was found that the efficiency increases with a decrease in slit-width at slow flow rates. The smaller the slit-width, however, the more uniform must be the respective temperatures of the hot and cold walls and the less viscous must be the liquid at the mean operating temperature.

It was also found that the rate at which a given degree of separation could be obtained for a given slit-width depends to a large extent upon the temperature differential between the hot and cold walls. The upper limit of this temperature differential, for a given slit-width, is limited only by the boiling point of the liquid at the pressure of the operation and the turbulence it induces, since it is desirable at all times to maintain a laminar flow of the liquids along the hot and cold walls. Consequently, there can be no definite upper limit to the temperature differential because the turbulence induced by a given temperature differential, and the temperature at which the material will be maintained in the liquid phase at the pressure of the operation vary with the liquid involved. Since both the velocity of the molecules and the speed of convective circulation for a given liquid are apparently dependent to the same degree upon the temperature differential, the path of travel of the diffusing molecules, albeit not their speed, is believed not be affected appreciably by a difference in temperature differential. Hence there is also no definite lower limit to the temperature differential because even at a differential at only 1° F. liquid thermal diffusion will take place at a slow rate.

Generally, the slit-width is usually not greater than about $\frac{1}{8}$ of an inch. Slit-widths within the range of 0.020 to 0.060 inch are preferred. At slit-widths below and above this, under given temperature conditions and at optimum feed rates, the degree of separation falls off. From this it follows that for a given degree of separation the rate of flow is a function of column height, slit-width, and temperature conditions, i. e., the temperature level of operation and the temperature differential.

For a given slit or column length, slit-widths of between 0.020 to 0.050 inch are preferred at rates of flow below about 30 cc./hour and slit-widths of between 0.025 and 0.060 inch are preferred at rates of flow above about 30 cc./hour. The optimum slit-width ranges are tabulated below for various rates of flow through a column 24 feet long and one inch mean slit diameter:

TABLE I

| Rates of Flow (cc./hr.) | Optimum Slit-Width Range (inches) |
|---|---|
| 10 | 0.0300–0.0350 |
| 20 | 0.0320–0.0400 |
| 40 | 0.0375–0.0470 |
| 60 | 0.0400–0.0500 |
| 100 | 0.0420–0.0505 |
| 130 | 0.0420–0.0510 |

The length of the slit is limited only by practical considerations such as the height of the space available for the apparatus, the structural strength of the material, the optimum rate of flow of the liquid through the apparatus walls, and the practicability of uniformly heating or cooling one or both of the walls.

The main requirement in locating the inlet feed is that the liquid introduced thereby will not enter a take-off port before being subjected to thermal diffusion. While the most efficient separations have thus far been obtained while introducing liquid through an inlet feed located midway between the two take-off ports, it is within the scope of this invention to locate the inlet feed closer to one take-off port than to another, especially when the different fractions are removed at different rates of flow. Furthermore, it is possible to feed the incoming liquid into the top of a descending stream that is adjacent the cold wall, or into the bottom of an ascending stream that is adjacent the hot wall.

A great many varieties of liquids have been subjected to thermal diffusion in developing the present invention, and the results have been quite surprising. It was found that when naphtha was subjected to thermal diffusion the bottom fraction had an improved knock rating and the top fraction had an impaired knock rating. Lubricating oil stock was separated into a top fraction having an improved color and a higher viscosity index and a bottom fraction wherein the color was intensified and the viscosity index lowered. Catalytically cracked gas oil was resolved into a top fraction having an increased concentration of paraffins and a bottom fraction having an increased concentration of aromatics. Monomethyl naphthalene resulted in a top fraction of the beta isomer and in a bottom fraction of the alpha isomer. 1,2-di-methyl cyclohexane was split into a top fraction containing a greater concentration of the trans-stereo isomer and a bottom fraction containing a greater concentration of the cis-stereo isomer. A mixture of ortho and para-xylene was split into a top fraction with a higher concentration of para-xylene and a bottom fraction with a higher concentration of ortho-xylene. Castor oil was resolved into a top fraction of lighter color, less acid, lower viscosity, more odor, and a lower refractive index and a bottom fraction having darker color, more acid, higher viscosity, no odor, and a higher refractive index than the initial castor oil. Sperm oil was resolved into a top fraction of lighter color, lower viscosity and lower refractive index and a bottom fraction of darker color, higher viscosity, and higher refractive index. Commercial oleic acid was resolved into a top fraction having a lighter color, more odor, and a lower viscosity and a bottom fraction having more color, no odor, and a higher viscosity.

Without intending to limit in any way the scope of the invention, but merely to illustrate the operativeness and utility of the apparatus herein described, the following examples are included:

Example 1

A lubricating petroleum oil stock having a viscosity of 300 SUS at 100° F. and an $N_D^{20}$ of 1.5025, referred to by the trade name #300 Red oil, was subjected to thermal diffusion in a glass column having a slit-length of 8 ft., a slit-width of $\frac{1}{16}$ of an inch and a surface slit-area of 2 sq. ft., the temperature of the outer wall being maintained at 100° C. by passing steam at atmospheric pressure through a jacket surrounding the outer tube and that of the exterior wall being maintained at 20° C. by circulating tap water through the inner tube. The Red oil was introduced into the column midway between the take-off ports at a rate of 20 cc./hour. The fractions were removed from the top and bottom at equal rates and the following results were obtained:

|  | Initial Red Oil | Top Fraction | Bottom Fraction |
|---|---|---|---|
| Viscosity Index | 60 | 85 | 27 |
| Optical Density | 411 | 205 | 595 |
| Pour Point, °C | 37 | 24-28 | 16 |

Example 2

The same Red oil was subjected to thermal diffusion in a brass plate type of apparatus having a slit-width of $\frac{1}{32}$ of an inch, a height of 5 ft., and a slit surface area of 1.25 sq. ft. One plate was maintained at a temperature of 100° C. and the other at 20° C. The Red oil was introduced into the slit midway between the take-off ports at a rate of 5 cc./hour and the top and bottom fractions were withdrawn at equal rates. The following results were obtained:

|  | Top Fraction | Bottom Fraction |
|---|---|---|
| Viscosity Index | 113 | −22 |
| Optical Density | 60 | 873 |
| Pour Point, °C | 23-28 | 13-18 |

Example 3

The same Red oil was subjected to thermal diffusion in the 8 ft. glass column described in Example 1. The top fraction, however, was withdrawn at a rate 15% that of the inlet feed and the bottom fraction was withdrawn at a rate 85% that of the inlet feed, the inlet feed again being 20 cc./hour. The following results were obtained:

|  | Top Fraction | Bottom Fraction |
|---|---|---|
| Viscosity Index | 93 | 47 |
| Optical Density | 145 | 454 |
| Pour Point, °C | 45 | 30 |

Example 4

The bottom fraction of Red oil obtained in accordance with Example 3, was again passed through the 8 ft. glass column described in Example 1, and the top and bottom fractions through this second pass were removed at equal rates. The following results were obtained:

|  | Top Fraction | Bottom Fraction |
|---|---|---|
| Viscosity Index | 73 | 21 |
| Optical Density | 234 | 645 |
| Pour Point, °C | 41 | 3 |

Example 5

The Red oil of Example 1 was passed through the 8 ft. glass column described in Example 1, but the top fraction was withdrawn at a rate only 5% of the inlet feed rate, whereas the bottom fraction was withdrawn at a rate 95% that of the inlet feed. The following results were obtained:

|  | Top Fraction | Bottom Fraction |
|---|---|---|
| Viscosity Index | 95 | 45 |
| Optical Density | 112 | 496 |
| Pour Point, °C | 42 | 14 |

Example 6

The same Red oil having an $N_D^{20}$ of 1.5025 was introduced into the slit of a concentric tube type apparatus made of brass and having a slit-width of 0.0115 inch, a slit-length of 2 ft. and a slit surface area of 0.65 sq. ft. and allowed to stand for one week while maintaining one surface of the slit at a temperature of 150° C. and the other at 100° C. The effluents were withdrawn from the top and bottom take-off passages in equal volume.

It was found upon examination that the fraction from the top take-off passage had an $N_D^{20}$ of 1.4870 and that the fraction withdrawn from the bottom take-off passage had an $N_D^{20}$ of 1.5501. This shows that a very short column can be used if the feed rate is slow enough.

Example 7

The same Red oil was subjected to thermal diffusion in a tube-type column having a slit-length of six feet and a slit-width of $\frac{1}{32}$ of an inch (0.031"). The outer tube was surrounded by a third tube to form a heating jacket and a resistance wire was wound spirally around the outside of said jacket. The Red oil was passed through said heating jacket and fed into the slit midway between the ends through a number of small feed holes in the tube forming the outer hot wall of the slit, the Red oil thus being preheated and at the same time serving as a conductor of the heat from the resistance wire to the hot wall of the slit. The temperature of the hot wall was maintained at 100° C. and that of the cold wall was maintained at between 10° and 20° C. by circulation of tap water through the innermost tube. The top and bottom fractions were removed at equal rates.

The following results were obtained:

| Rate of Feed (cc./hour) | Change of Index of Refraction between Top and Bottom Fractions |
|---|---|
| 20 | .0006 |
| 10 | .0098 |
| 8 | .0152 |
| 5 | .0300 |
| 4 | .0525 |

Example 8

The same Red oil was subjected to thermal diffusion in the apparatus described in Example 7. The temperature of the hot wall, however, was raised to between 125° and 140° C. and that of the cold wall was raised to 100° C. by passing a circulating boiling water system at atmospheric pressure through the interior of the innermost tube.

The results obtained were as follows:

| Rate of Feed (cc./hour) | Change of Index of Refraction between Top and Bottom Fractions |
|---|---|
| 130 | .0040 |
| 96 | .0070 |
| 80 | .0090 |
| 50 | .0104 |
| 32 | .0144 |
| 24 | .0188 |
| 12 | .0271 |

Example 9

The same Red oil was subjected to thermal diffusion in the apparatus described in Example 7. The hot wall, however, was maintained at a temperature of 150°–165° C. and the cold wall was maintained at a temperature of about 115° C. by passing through the interior of the innermost tube a mixture of water and ethylene glycol boiling at that temperature.

The results obtained are tabulated below:

| Rate of Feed (cc./hour) | Change of Index of Refraction between Top and Bottom Fractions |
|---|---|
| 132 | .0051 |
| 112 | .0059 |
| 80 | .0080 |
| 60 | .0102 |
| 48 | .0125 |
| 29 | .0182 |
| 18 | .0240 |

Example 10

The innermost tube of the apparatus described in Example 7 was replaced by one of smaller outside diameter to form a slit having a width of 0.068 inch. The hot wall of the slit was maintained at 150° C. and the cold wall was maintained at a temperature of 100° C.

The results obtained by passing the Red oil of Example 7 through the slit are tabulated below:

| Rate of Feed (cc./hour) | Change of Index of Refraction between Top and Bottom Fractions |
|---|---|
| 288 | .0040 |
| 62 | .0056 |
| 0 | .0098 |

Example 11

An azeotropic mixture consisting of 56% ethylene glycol and 44% benzyl alcohol that could not be rectified by distillation was charged to the apparatus described in Example 2. The inlet passage was located midway between take-off ports and the fractions from the take-off ports were removed at equal rates.

It was found that after only a single passage through this apparatus the degree of separation obtained was 29% of that theoretically possible.

Example 12

A mixture of equal parts of isopropyl benzene and hexadecane was introduced at the rate of 50 cc./hour into a 24 ft. concentric tube column of metal having a slit-width of $\frac{1}{42}$ of an inch (.0238") and a slit surface area of 12.56 sq. ft. and a mean slit diameter of one inch. The inner tube of the column was maintained at a temperature of 20° C. and the outer tube was maintained at a temperature of 100° C. and the effluents were withdrawn from the top and bottom at equal rates.

It was found that when the mixture was introduced at a rate of 50 cc./hour a 23% separation of the components was obtained.

Example 13

Crude menhaden fish oil was introduced at a rate of 20 cc./hour into the apparatus described in Example 1. The inner tube was maintained at a temperature of 20° C. and the outer tube was maintained at a temperature of 100° C.

A colorimetric method of evaluating the concentration of vitamin A in the fish oil utilizing $SbCl_3$ in $CHCl_3$ was applied to the fractions and to the initial fish oil, the vitamin A producing a blue color with said reagent. The optical densities of the colored solutions produced by this test were measured in a Duboscq colorimeter.

The results of a single passage of the fish oil through the apparatus are as follows:

|  | $N_D^{20}$ | OD/g. |
|---|---|---|
| Initial Menhaden Oil | 1.4791 | 15.4 |
| Top Fraction | 1.4789 | 12.6 |
| Bottom Fraction | 1.4800 | 22.4 |

Example 14

A mixture containing 64% by volume hexadecane and 36% by volume of cyclohexane was introduced into the slit of an aluminum column having a slit length of five feet, a slit-width of .013 inch and a mean slit diameter of .638 inch. After a state of equilibrium was obtained, the effluents were withdrawn from the top and bottom take-off ports at equal rates.

The following results were obtained:

|  | Proportions by Volume of Hexadecane to Cyclohexane | $N_D^{20}$ |
|---|---|---|
| Initial Mixture | 64:36 | 1.4308 |
| Top Fraction | 56:44 | 1.4301 |
| Bottom Fraction | 67.5:32.5 | 1.4311 |

The term "optical density" in the present disclosure represents the standard logarithmic ratio of intensity of an incident ray falling on a transparent or translucent medium to the intensity of the transmitted ray for a sample length of one meter and light of wave length from 5100 to 5500 Angstroms.

Application Serial Nos. 760,350, filed July 11, 1947, and 762,746, filed July 22, 1947, describe and claim methods which may be carried out by means of the apparatus described in this application.

We claim:

1. Liquid thermal diffusion apparatus comprising a bundle of parallel tube units, each tube unit including two substantially vertical and concentric tubes, the outer periphery of the inner tube being substantially equidistantly spaced between 0.02 and about 0.06 inch from the inner periphery of the outer tube to form a narrow slit between said tubes, a first header disposed around said outer tubes intermediate the ends thereof and communicating with the slits between said inner and outer tubes of said bundle for the introduction into said slits of a liquid, a second header at one end of said bundle of tube units communicating with said narrow slits to effect the withdrawal from said slits of one fraction of said liquid, a third header at the other end of said bundle of tube units communicating with the narrow slits to effect the withdrawal therefrom of another fraction of said liquid, headers communicating with the inside of said inner tubes through which a fluid may be passed from it and a jacket surrounding the outside of said outer tubes through which a fluid may be passed, whereby a temperature gradient may be maintained across said slit when said fluids are at different temperatures.

2. Liquid thermal diffusion apparatus comprising a container having two substantially parallel and vertical, liquid-impervious stationary walls the opposed faces of which are smooth and spaced between 0.02 and about 0.06 inch apart to form a substantially uniform narrow slit, at least one of said walls being provided with heat transfer means so as to maintain a temperature gradient between said opposed smooth faces, take-off ports communicating with said slit at different levels and at points remote from one another, and an inlet port communicating with said slit between said take-off ports.

3. The apparatus defined in claim 2 wherein the substantially parallel and vertical, stationary walls are formed by concentrically arranged tubes, one wall comprising the outer surface of the inner tube and the other wall comprising the inner surface of the outer tube.

4. The apparatus as defined in claim 2 wherein the two substantially parallel and vertical, stationary walls are formed by flat plates separated from one another by a spacing gasket around and between their peripheral edges.

ARTHUR LETCHER JONES.
EVERETT C. HUGHES.

REFERENCES CITED

The following references are of record in the file of this patent:

UNITED STATES PATENTS

| Number | Name | Date |
|---|---|---|
| 1,174,631 | Snelling | Mar. 7, 1916 |
| 1,864,511 | Jones | June 21, 1932 |
| 2,158,238 | Hvid | May 16, 1939 |
| 2,258,594 | Brewer et al. | Oct. 14, 1941 |
| 2,268,134 | Clusius | Dec. 30, 1941 |
| 2,411,238 | Zender | Nov. 19, 1946 |

FOREIGN PATENTS

| Number | Country | Date |
|---|---|---|
| 509,618 | Great Britain | July 19, 1939 |
| 738,812 | Germany | Sept. 2, 1943 |

OTHER REFERENCES

Berichte, vol. 73, pages 249 to 269.